US012779691B2

(12) United States Patent
Sun et al.

(10) Patent No.: US 12,779,691 B2
(45) Date of Patent: *Nov. 3, 2026

(54) CONTROLLING MULTIPLE ROBOTS TO COOPERATIVELY PICK AND PLACE ITEMS

(71) Applicant: Dexterity, Inc., Redwood City, CA (US)

(72) Inventors: Zhouwen Sun, San Mateo, CA (US); Rohun Kulkarni, Palo Alto, CA (US); Talbot Morris-Downing, Redwood City, CA (US); Harry Zhe Su, Union City, CA (US); Samir Menon, Atherton, CA (US); Kevin Jose Chavez, Redwood City, CA (US); Robert Holmberg, Mountain View, CA (US); Alberto Leyva Arvayo, Palo Alto, CA (US); Toby Leonard Baker, Redwood City, CA (US)

(73) Assignee: Dexterity, Inc., Redwood City, CA (US)

(*) Notice: Subject to any disclaimer, the term of this patent is extended or adjusted under 35 U.S.C. 154(b) by 178 days.

This patent is subject to a terminal disclaimer.

(21) Appl. No.: 17/978,610

(22) Filed: Nov. 1, 2022

(65) Prior Publication Data

US 2023/0158676 A1 May 25, 2023

Related U.S. Application Data

(60) Provisional application No. 63/274,465, filed on Nov. 1, 2021.

(51) Int. Cl.

| | |
|---|---|
| ***B25J 9/16*** | (2006.01) |
| ***B25J 13/08*** | (2006.01) |
| ***B25J 19/02*** | (2006.01) |

(52) U.S. Cl.

CPC ........... *B25J 9/1682* (2013.01); *B25J 9/1633* (2013.01); *B25J 9/1666* (2013.01); *B25J 9/1669* (2013.01);

(Continued)

(58) Field of Classification Search

None

See application file for complete search history.

(56) References Cited

U.S. PATENT DOCUMENTS

| | | | |
|---|---|---|---|
| 5,015,145 | A | 5/1991 | Angell |
| 6,330,493 | B1 | 12/2001 | Takahashi |

(Continued)

FOREIGN PATENT DOCUMENTS

| | | |
|---|---|---|
| CN | 202625405 | 12/2012 |
| CN | 105751196 | 7/2016 |

(Continued)

OTHER PUBLICATIONS

Wataru Miyazaki, Jun Miura, Object Placement Estimation with Occlusions and Planning of Robotic Handling Strategies, Jul. 7, 2017, 2017 IEEE International Conference on Advanced Intelligent Mechatronics, p. 602-607 (Year: 2017).*

(Continued)

*Primary Examiner* — Khoi H Tran
*Assistant Examiner* — Dairon Estevez
(74) *Attorney, Agent, or Firm* — Van Pelt, Yi & James LLP

(57) ABSTRACT

A robotic system is disclosed to control multiple robots to cooperatively pick and place objects. In various embodiments, the robotic system includes a first robotic arm having a first end effector; a second robotic arm having a second end effector; and a control computer configured to use the first robotic arm and the second robotic arm to pick and place a plurality of objects, including by using the first robotic arm (Continued)

and the second robotic arm to work cooperatively to pick and place one or more of the objects.

17 Claims, 7 Drawing Sheets

(52) U.S. Cl.
CPC ........... *B25J 9/1697* (2013.01); *B25J 13/082* (2013.01); *B25J 13/085* (2013.01); *B25J 19/023* (2013.01)

(56) References Cited

U.S. PATENT DOCUMENTS

| | | | | |
|---|---|---|---|---|
| 7,010,390 | B2 | 3/2006 | Graf | |
| 9,492,924 | B2 | 11/2016 | Bradski | |
| 10,192,195 | B1 | 1/2019 | Brazeau | |
| 10,556,761 | B2 | 2/2020 | Criswell | |
| 10,807,805 | B2 | 10/2020 | Clucas | |
| 11,203,120 | B1 | 12/2021 | Hill | |
| 11,426,864 | B2 * | 8/2022 | Hallock | B25J 9/1682 |
| 11,577,916 | B2 | 2/2023 | Condon | |
| 2002/0029095 | A1 | 3/2002 | Kosaka | |
| 2005/0027394 | A1 | 2/2005 | Graf | |
| 2005/0055132 | A1 | 3/2005 | Matsumoto | |
| 2007/0140821 | A1 | 6/2007 | Garon | |
| 2009/0055024 | A1 | 2/2009 | Kay | |
| 2010/0239408 | A1 | 9/2010 | Becker | |
| 2015/0148952 | A1 | 5/2015 | Shiratsuchi | |
| 2015/0352721 | A1 | 12/2015 | Wicks | |
| 2016/0031084 | A1 | 2/2016 | Yamazaki | |
| 2016/0288324 | A1 | 10/2016 | Bradski | |
| 2016/0346918 | A1 | 12/2016 | Inutake | |
| 2018/0161979 | A1 * | 6/2018 | Okamoto | B25J 9/1664 |
| 2018/0362270 | A1 | 12/2018 | Clucas | |
| 2019/0047148 | A1 | 2/2019 | Fremuth | |
| 2019/0047149 | A1 * | 2/2019 | Wouhaybi | B25J 9/163 |
| 2019/0283255 | A1 | 9/2019 | Wang | |
| 2019/0315582 | A1 | 10/2019 | Criswell | |
| 2020/0055195 | A1 | 2/2020 | Ignakov | |
| 2020/0115174 | A1 | 4/2020 | Bangalore Srinivas | |
| 2020/0165074 | A1 | 5/2020 | Wagner | |
| 2020/0171650 | A1 | 6/2020 | Hallock | |
| 2020/0368910 | A1 * | 11/2020 | Chu | G05B 19/0421 |
| 2020/0405417 | A1 * | 12/2020 | Shelton, IV | A61B 17/07207 |
| 2021/0046656 | A1 | 2/2021 | Biswas | |
| 2021/0107151 | A1 * | 4/2021 | Wouhaybi | B25J 9/1661 |
| 2021/0122035 | A1 | 4/2021 | Furlan | |
| 2021/0146532 | A1 * | 5/2021 | Rodriguez Garcia | B25J 13/084 |
| 2021/0201183 | A1 * | 7/2021 | Natarajan | B25J 9/163 |
| 2021/0229281 | A1 * | 7/2021 | Natarajan | B25J 9/163 |
| 2022/0203542 | A1 * | 6/2022 | Garabini | B25J 13/08 |
| 2022/0371186 | A1 | 11/2022 | Zhang | |
| 2023/0166402 | A1 | 6/2023 | Terasaka | |
| 2024/0075625 | A1 | 3/2024 | Mao | |

FOREIGN PATENT DOCUMENTS

| | | | | |
|---|---|---|---|---|
| CN | 109693903 | | 4/2019 | |
| CN | 112264852 | | 1/2021 | |
| CN | 112296995 | | 2/2021 | |
| CN | 111515949 | | 8/2021 | |
| CN | 113427483 | | 9/2021 | |
| CN | 113460730 | | 10/2021 | |
| CN | 111612312 | | 12/2023 | |
| DE | 102016107268 | A1 * | 10/2017 | B25J 9/1682 |
| DE | 102017117326 | | 1/2019 | |
| DE | 102019102470 | | 8/2020 | |
| EP | 3706079 | | 9/2020 | |
| JP | 1083208 | | 3/1998 | |
| JP | 2016504983 | | 2/2016 | |
| JP | 2018094649 | | 6/2018 | |
| JP | 2019150918 | | 9/2019 | |
| WO | 2014128493 | | 8/2014 | |
| WO | 2018091103 | | 5/2018 | |
| WO | WO-2018091103 | A1 * | 5/2018 | G05B 19/423 |

OTHER PUBLICATIONS

Joseph M. Romano, Kaijen Hsiao, Gunter Niemeyer, Sachin Chitta, and Katherine J. Kuchenbecke, Human-Inspired Robotic Grasp Control With Tactile Sensing, Dec. 2011, IEEE Transactions on Robotics, vol. 27, No. 6, p. 1067-1079 (Year: 2011).*

Adithyavairavan Murali, Yin Li, Dhiraj Gandhi, Abhinav Gupta, Learning to Grasp without Seeing, May 10, 2018, Cornell University, pp. 1-10 (Year: 2018).*

Ernesto Nunes, Marie Manner, Hakim Mitiche, Maria Gini, A taxonomy for task allocation problems with temporal and ordering constraints, Oct. 2016, Robotics and Autonomous Systems vol. 90, Apr. 2017, pp. 55-70 (Year: 2016).*

Ernesto Nunes, Maria Gini, Multi-Robot Auctions for Allocation of Tasks with Temporal Constraints, vol. 29 No. 1 (2015): Twenty-Ninth AAAI Conference on Artificial Intelligence, pp. 2110-2116 (Year: 2015).*

Author Unknown, AI-powered software that transforms warehouse robots, Dexterity, Robotic Truck Loading and Unloading, Products, 2023, 14 pages, https://www.dexterity.ai/product/robotic-truck-loading.

* cited by examiner

CONTROLLING MULTIPLE ROBOTS TO COOPERATIVELY PICK AND PLACE ITEMS

CROSS REFERENCE TO OTHER APPLICATIONS

This application claims priority to U.S. Provisional Patent Application No. 63/274,465 entitled CONTROLLING MULTIPLE ROBOTS TO COOPERATIVELY PICK AND PLACE ITEMS filed Nov. 1, 2021, which is incorporated herein by reference for all purposes.

BACKGROUND OF THE INVENTION

Robots have been provided to perform a variety of tasks, such as manipulating objects. For example, a robotic arm having an end effector may be used to pick and place items. Examples of commercial applications of such robots include sortation, kitting, palletization, depalletization, truck or container loading and unloading, etc.

In some contexts, the objects to be handled vary considerably in size, weight, packaging, and other attributes. Typically, a robotic arm is rated to handle up to a maximize size, weight, etc. of object. In some contexts, the conventional approach may require a robotic arm able to handle the largest, heaviest, and/or otherwise most difficult object that may be required to be handled.

BRIEF DESCRIPTION OF THE DRAWINGS

Various embodiments of the invention are disclosed in the following detailed description and the accompanying drawings.

DETAILED DESCRIPTION

Figure 1:
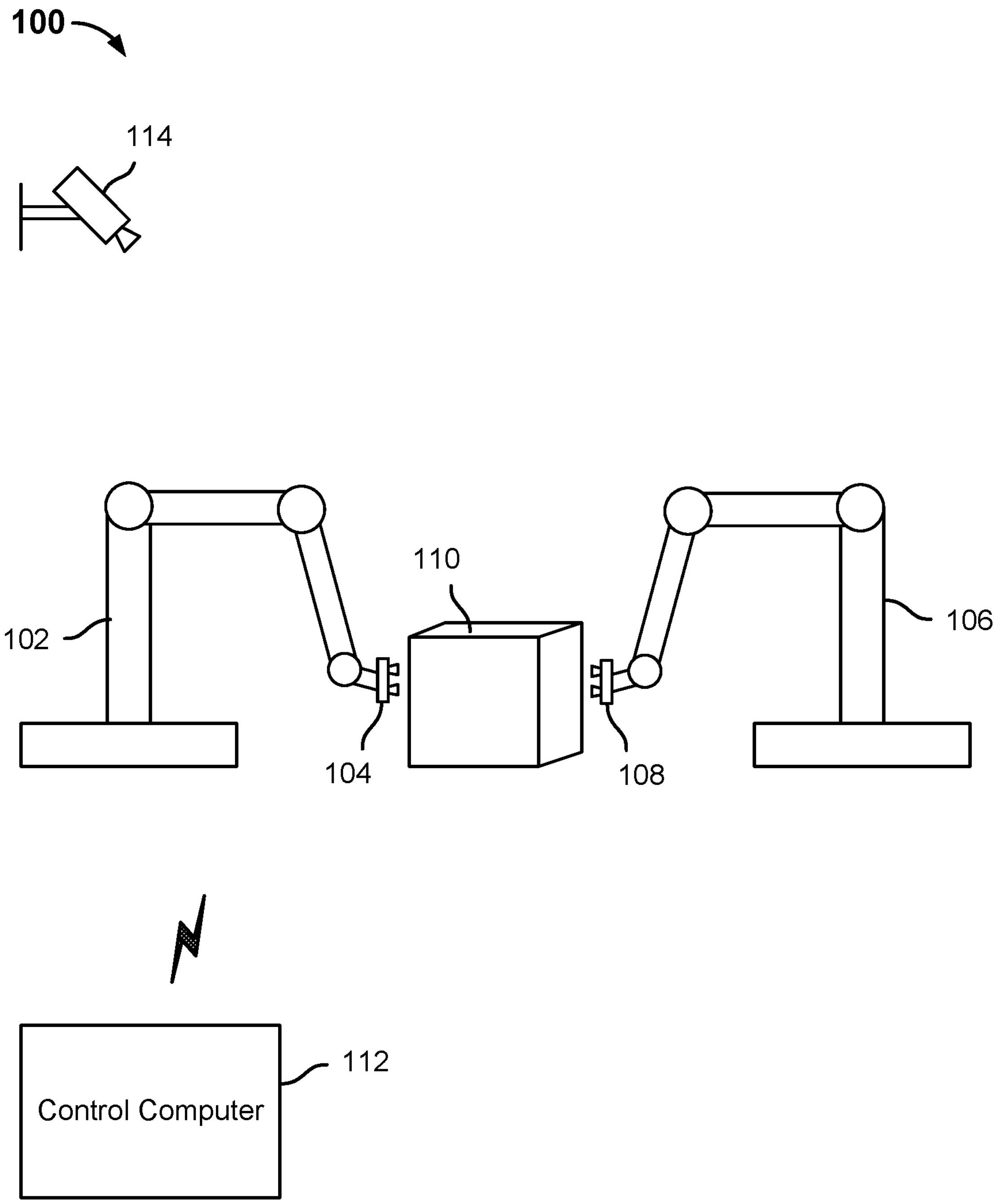
FIG. 1 is a block diagram illustrating an embodiment of a robotic system configured to control a plurality of robots to perform a task cooperatively.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system is disclosed to coordinate and control the use of multiple robots to collaboratively pick and place a package. In various embodiments, a system as disclosed herein may have one or more of the following technical features:

- System detects objects that should be picked collaboratively
- Integrated computer vision system to identify obstacles and prioritize package picking from a stack for safe collaborative motion.
- Planning and execution of coordinated pick of a single object by multiple robots.
- Control architecture that allows robots to cooperate to lift and place the object in a safe, controlled manner.
- Robots are capable of independent behavior outside of collaborative task.

In various embodiments, multiple robotic arms are used to collaboratively pick and place a single package. In some embodiments, a robotic singulation (or other pick/place) system detects that an object should be picked collaboratively using two or more robots, e.g., due to the object's size, weight, previous failed pick attempts, visual classification and/or affordance mismatch between objects and individual robot grippers.

In various embodiments, when both robots have stopped picking independently, the system decides how best to pick the object, ensuring that the grasp points are within reach of the robots, and on opposite sides of the object. Robots clear any surrounding packages that might block the robots from picking the desired package. The robots plan paths independently to get to the pick positions on either side of the object. Once both are in place, the lead robot begins moving back, and the following robot maintains its relative position/orientation to the lead bot, while also using force control to maintain contact with the box, which allows the robots to collaboratively lift and move heavy or oversized objects.

Additional techniques implemented in various embodiments include, without limitation, one or more of:

- Tactile manipulation to enhance non-visible parts of the objects: To make sure multiple robots can find a collision-free pick on the same object, sometimes one of the robots must pick on the side of the objects that is not visible to the robot. In some embodiments, tactile perception from the gripper is used to blindly explore the back side of the object to find a stable and collision-free pick location.
- Push to improve visibility of objects and improve grasp stability: sometimes not all the sides of the objects are visible to the robots to achieve cooperative pick, the robots need to rearrange the position/orientation of the object to unveil pickable locations for multiple robots. This rearrangement may be done through pushing with one robot or multiple robots to identify more stable grasp points.
- Collision avoidance among multiple robots: multiple robot motion should be coordinated in a collision free manner as well as with their corresponding environment.

FIG. 1 is a block diagram illustrating an embodiment of a robotic system configured to control a plurality of robots to perform a task cooperatively. In the example shown, system and environment 100 includes a first robotic arm 102 equipped with a suction-type end effector 104 and a second robotic arm 106 equipped with a suction-type end effector 108. In the state shown, robotic arm 102 and robotic arm 106 are positioned to perform cooperatively a pick and place task with respect to a large box 110. A control computer 112 is configured to communicate wirelessly with one or more of the robotic arm 102, robotic arm 106, and one or more cameras or other sensors 114 in the workspace. Image data received from camera 114, for example, may be used by the control computer 112 to generate a three-dimensional view of the workspace and to send commands and information to the robotic arm 102 and robotic arm 106, as appropriate, to facilitate the cooperative pick and place task.

Figure 2A:
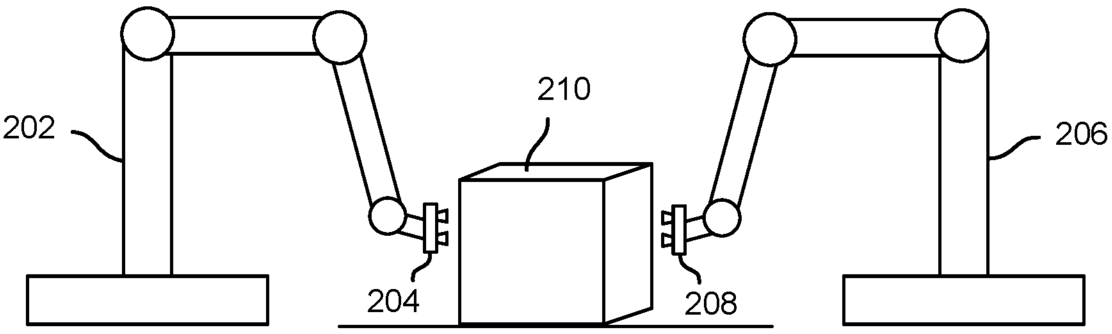
FIGS. 2A-2C illustrate an example of a cooperative pick and place task performed in an embodiment of a robotic system as disclosed herein.
Figure 2B:
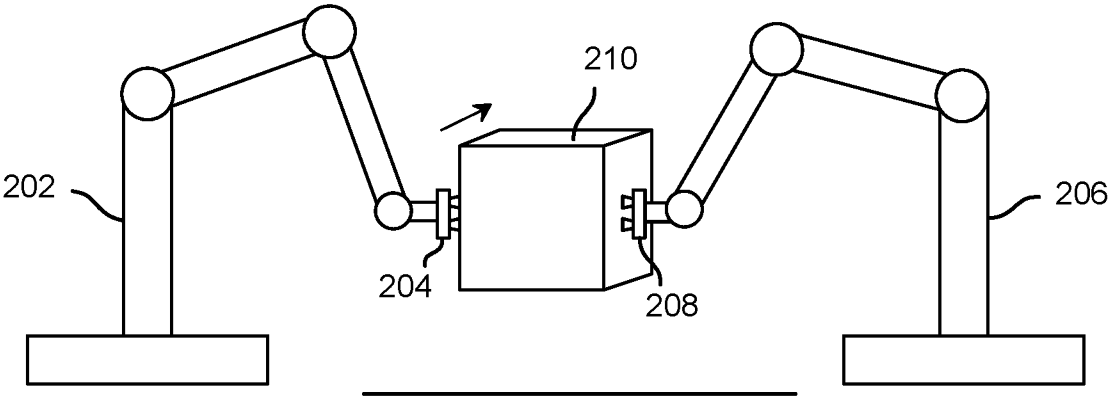
Figure 2C:
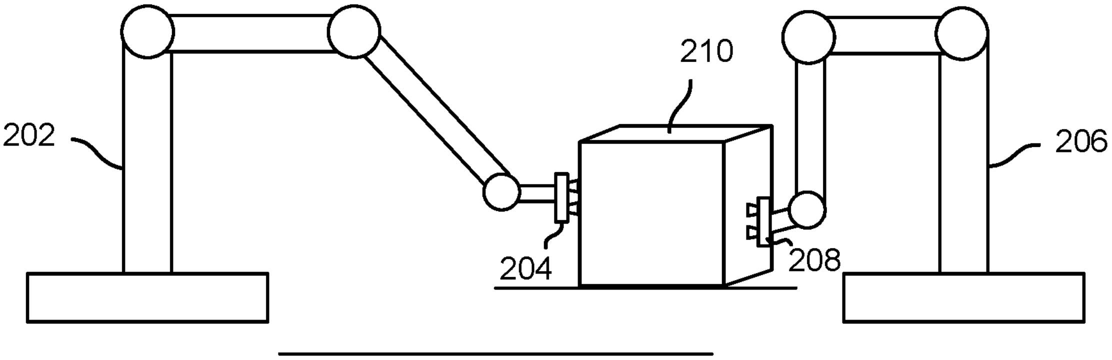

FIGS. 2A-2C illustrate an example of a cooperative pick and place task performed in an embodiment of a robotic system as disclosed herein. In the example shown, in FIG. 2A robotic arm 202 with suction type end effector 204 and robotic arm 206 with suction type end effector 208 are positioned to begin to perform cooperatively a pick and place task with respect to large box 210, similar to the starting state shown in FIG. 1. In various embodiments, robotic arm 202 may be the "leader" and robotic arm 206 the "follower" in a cooperative pick and place as disclosed herein. The "leader" may be selected by any suitable method, such as by assigning the "leader" role to the robot that initiated the cooperative task, by assigning the role randomly to one or the other of the participating robots, by an "election" or other selection method.

To initiate the operation, in various embodiments, as "leader" robotic arm 202 would move its end effector 204 to the position shown and would then grasp the box 210, e.g., by moving the end effector 204 into a position in contact or nearly in contact with the side of box 210 and applying suction. A signal may be sent to the other robot (and/or a process to control the other robot) to indicate that the leader has completed its grasp. The follower, e.g., robotic arm 206 in this example, would then grasp the box 210, e.g., at a side opposite from the side at which the leader (i.e., robotic arm 202) had grasped the box 210. The follower would record a transform based on the position and orientation of the leader's end effector 204 and the relevant dimension of box 210. For example, the vision system and/or other sensors may be used to measure the dimension, or to recognize the box 210 (e.g., specifically and/or by type) and to use the item and/or type information to determine the dimension, e.g., by look up.

As shown in FIG. 2B, once both robots (202, 206) have grasped box 210. The leader, robotic arm 202 in this example, computes and moves the box along a trajectory determined by robotic arm 202 (and/or a control process associated therewith) independently of the follower robotic arm 206. In various embodiments, the follower robot, robotic arm 206 in this example, receives (e.g., periodically, continuously, etc.) position and orientation information for the end effector 204 of leader robotic arm 202. The follower robotic arm 206 (and/or a control process associated therewith) uses the position and orientation information of the leader robot (202, 204) and the previously-determined and recorded transform to compute a new target position and orientation for the follower's end effector 208, and computes and applies torques to motors comprising robotic arm 206 as needed to minimize the error (difference) between the current position and orientation of the follower's end effector 208 and the (most recently updated) target.

Once the object (box 210) has been placed in the destination position, as shown in FIG. 2C for example, the leader robot (robotic arm 202) releases its grasp and informs the follower that the pick and place task has been completed. In response, the follower (robotic arm 206) releases its grasp and both robots (202, 206) are free to perform other work, such as (returning to) independently picking and placing smaller/lighter objects and/or cooperatively performing a next pick and place task for another large or heavy object.

Figure 3:
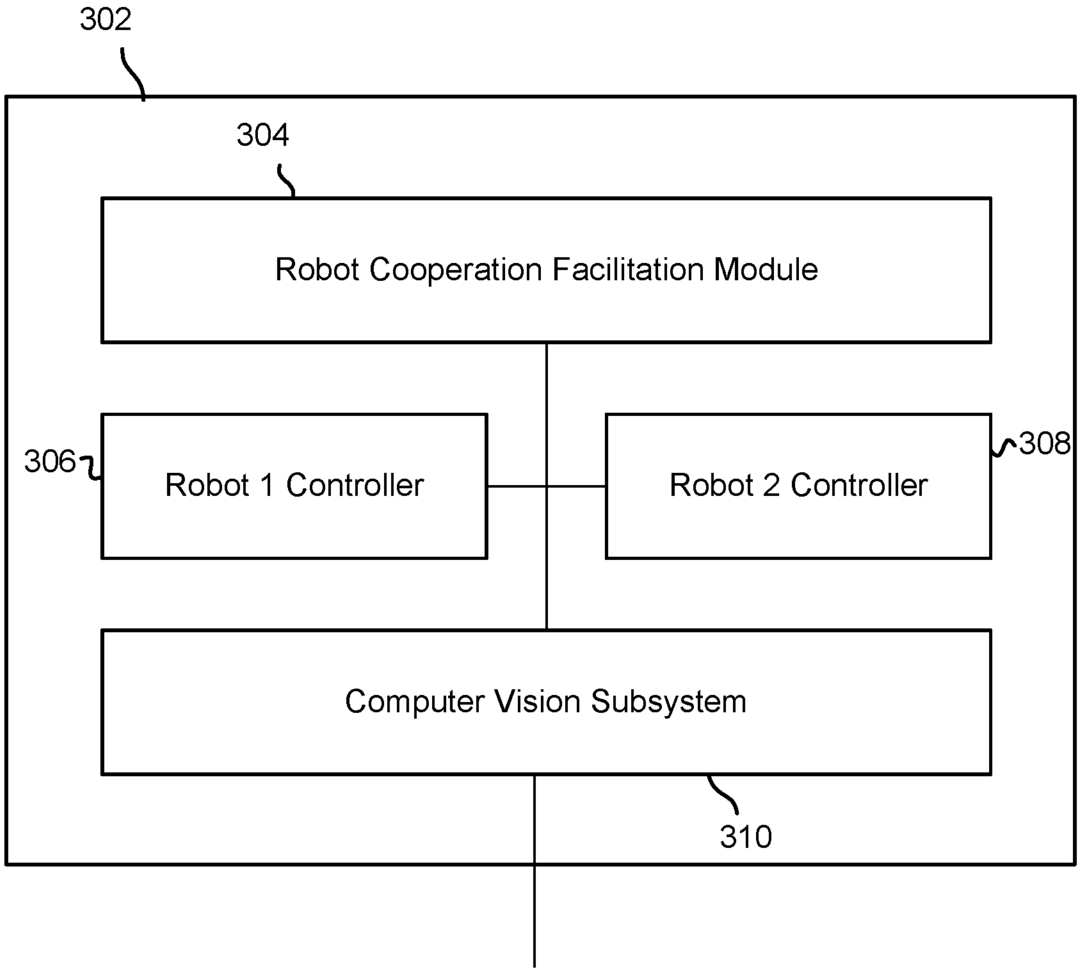
FIG. 3 is a block diagram illustrating an embodiment of a robotic control system.

FIG. 3 is a block diagram illustrating an embodiment of a robotic control system. In various embodiments, the robotic control system 302 of FIG. 3 includes or is included in the control computer 112 of FIG. 1. In various embodiments, one or more modules or subsystems comprising the robotic control system 302 of FIG. 3 may be distributed across multiple computing nodes, such as computers and/or processors comprising one or more of control computer 112, robotic arm 102, and/or robotic arm 106 of FIG. 1.

In the example shown, robotic control system 302 includes a hierarchical planner, scheduler, and/or control module comprising a robot cooperation facilitation module 304 configured to facilitate cooperative performance of tasks by two or more robots, as disclosed herein, and robot-specific controllers 306 and 308. For example, robot 1 controller 306 may be associated with robotic arm 102 of FIG. 1 and/or robotic arm 202 of FIGS. 2A through 2C, while robot 2 controller 308 may be associated with robotic arm 106 of FIG. 1 and/or robotic arm 206 of FIGS. 2A through 2C.

In various embodiments, the respective robots associated with robot 1 controller 306 and robot 2 controller 308, respectively, each may operate independently, e.g., to pick and place objects the robot is able to handle singly. In various embodiments, cooperative tasks using two or more robots may be initiated and/or performed by one or more of communications sent between robot 1 controller 306 and robot 2 controller 308; bilateral communications between robot cooperation facilitation module 304, on the one hand, and the respective robot 1 controller 306 and robot 2 controller 308, on the other; and/or communications among all three (or more) entities.

In the example shown, robotic control system 302 further includes a computer vision subsystem 310 configured to receive image and depth data from one or more 3D cameras and/or other sensors, such as camera 114 of FIG. 1, and to use the received data to generate and/or update a three-dimensional view of the workspace. The output of the computer vision subsystem 310 may be provided to one or more of the robot cooperation facilitation module 304, robot 1 controller 306, and robot 2 controller 308, to enable them to initiate and perform cooperatively a task to pick and place an item. For example, image data may be used to determine that a box or other object is too large and/or too heavy for a single robot to pick and place. The three-dimensional view of the workspace and objects within may also be used to determine respective grasp strategies and/or locations for each robot, to determine collision-free trajectories to move each robot's end effector to its corresponding pick location, and to determine a collision-free trajectory through which to cooperatively move the object to the destination location at which it is to be placed, for example.

Figure 4:
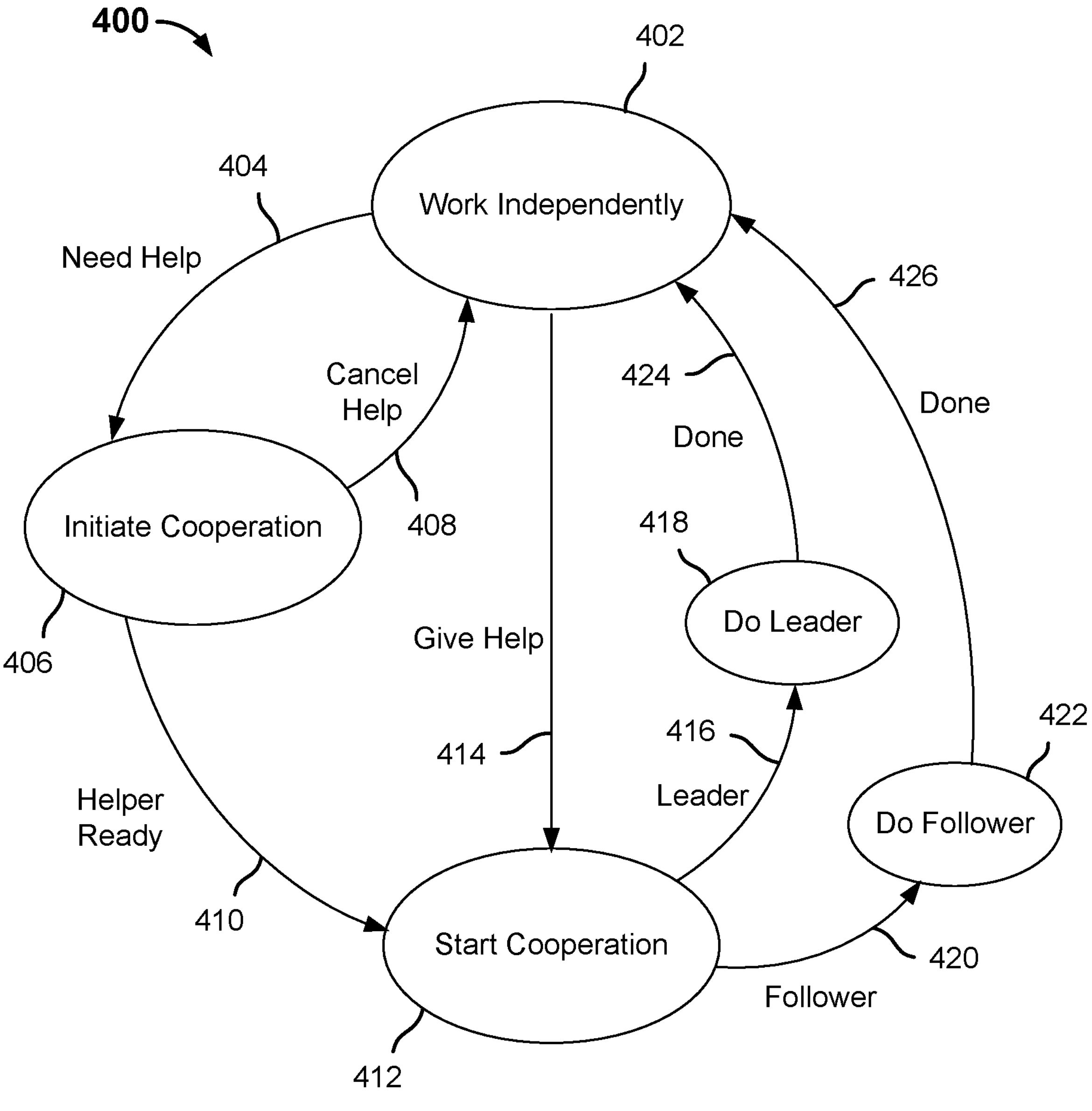
FIG. 4 is a state diagram illustrating an embodiment of a robotic system configured to control a plurality of robots to perform a task cooperatively.

FIG. 4 is a state diagram illustrating an embodiment of a robotic system configured to control a plurality of robots to perform a task cooperatively. In various embodiments, the state diagram 400 of FIG. 4 may be implemented by and/or with respect to a robot configured to cooperatively perform an operation using two or more robots. In some embodiments, the state diagram 400 of FIG. 4 may be implemented by control computer 112 of FIG. 1 and/or one or more of robot cooperation facilitation module 304, robot 1 controller 306, and robot 2 controller 308 of FIG. 3.

In the example shown, in state 402 a robot works independently to perform tasks. For example, the robot may independently pick and place items, such as to fill a box or other receptacle in a kitting operation, place items on a conveyer belt or other conveyance in a sortation operation, stack items on a pallet, etc. Upon receiving an indication that help is needed to perform a task (404), such as an indication that an item that has been perceived and which needs to be picked and placed is too large to grasp and move with one robot, the robot and/or controller transitions to a state 406 in which cooperative performance of the task is initiated. For example, a communication may be sent to another robot (e.g., from robot 1 controller 306 to robot 2 controller 308 of FIG. 3) or to a higher-level planner/scheduler (e.g., robot cooperation facilitation module 304 of FIG. 3), or the higher-level planner/scheduler may recognize the need for cooperative performance of the task and may initiate the transition to state 406.

In the example shown, the robot and/or controller may transition back to working independently in state 402, via a "cancel help" transition 408. For example, the robot/controller and/or a higher-level planner/scheduler may determine that the task has already been performed by and/or assigned to one or more other robots.

In some embodiments, in the "initiate cooperation" state 406, the robot/controller that is initiating cooperative performance of the task communicates directly or indirectly with a helper robot, e.g., by requesting help. Another robot may be assigned to help and/or may agree to help. The robot may be assigned and/or agree to help at a future time or upon occurrence of a future condition, such as completion of a task the helper robot has already started and/or a task that has higher priority. For example, a task to clear other objects from around the large or heavy object, to facilitate the cooperative task, may have a higher priority and therefore may be completed first. Once the helper robot is ready to perform the cooperative task, the helper robot informs the task initiator, directly or indirectly (e.g., via a higher-level planner/scheduler, such as robot cooperation facilitation module 304 of FIG. 3), that the helper robot is ready, prompting a transition 410 to "start cooperation" state 412. The helper may transition directly from working independently, in state 402, to "start cooperation" state 412, via the "give help" transition 414 in the example shown.

Once all participating robots are ready in the "start cooperation" state 412, a "leader" is determined, if needed, and the leader transitions (416) to "do leader" state 418 while the follower(s) transition (420) to "do follower" state 422. In the "do leader" state 418 and "do follower" state 422, the leader and follower(s) cooperate as disclosed herein to cooperative perform the task, such as to pick and place a large or heavy object, as in the example illustrated in FIG. 2A through 2C. Once the task has been completed, the leader and follower(s) transition (424, 426) back to the "work independently" state 402 and resume working independently.

Figure 5A:
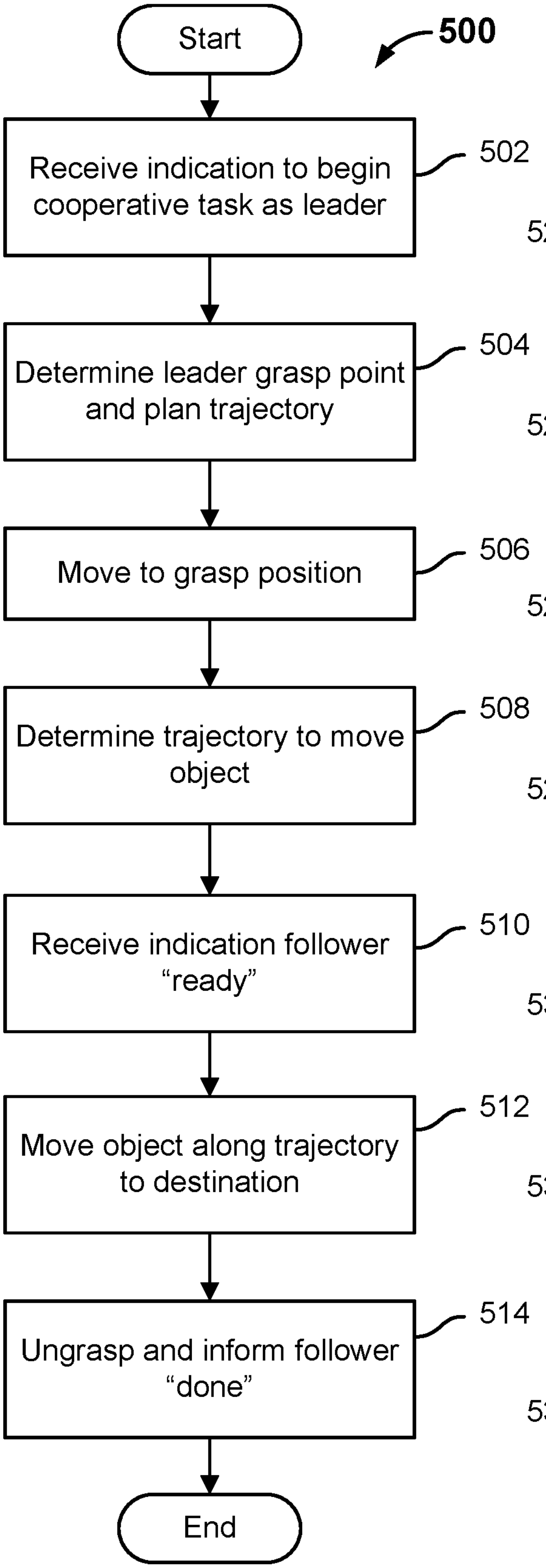
FIG. 5A is a flow diagram illustrating an embodiment of a process to cooperatively perform a task as a "leader" robot in an embodiment of a robotic system as disclosed herein.

FIG. 5A is a flow diagram illustrating an embodiment of a process to cooperatively perform a task as a "leader" robot in an embodiment of a robotic system as disclosed herein. In various embodiments, process 500 of FIG. 5A may be implemented by a robot controller associated with a robot that is participating as the "leader" in cooperative performance of a task by two or more robots as disclosed herein.

In the example shown, at 502 an indication to begin a cooperative task (with one or more other robots) in the role of "leader" is received. For example, an indication to cooperatively perform a pick and place task may be received. At 504, the leader determines a location at which to grasp the object and plans a trajectory to safely move its end effector into position to grasp the object and at 506 the leader moves its end effector along the trajectory to the grasp position. At 508, the leader determines (independently of any other robot) a trajectory to move the object to an associated destination. For example, a model of the robot and its kinematics and image and/or other information about the workspace (e.g., configuration data, CAD files, etc.), one or more attributes of the object (e.g., dimensions, rigidity, etc.), and image/sensor data may be used to plan the trajectory. At 510, an indication is received from the "follower" robot(s) with which the robot implement process 500 is to cooperate that the follower robot(s) is/are ready to begin cooperative performance of the task. In response, at 512 the "leader" robot moves its end effector (and the object in the joint grasp of the leader and follower(s)) to the destination along the trajectory determined by the leader. At 514, upon placing the object at the destination the leader robot releases its grasp and informs the follower robot(s) that the task has been completed. In various embodiments, the leader then resumes operating independently.

Figure 5B:
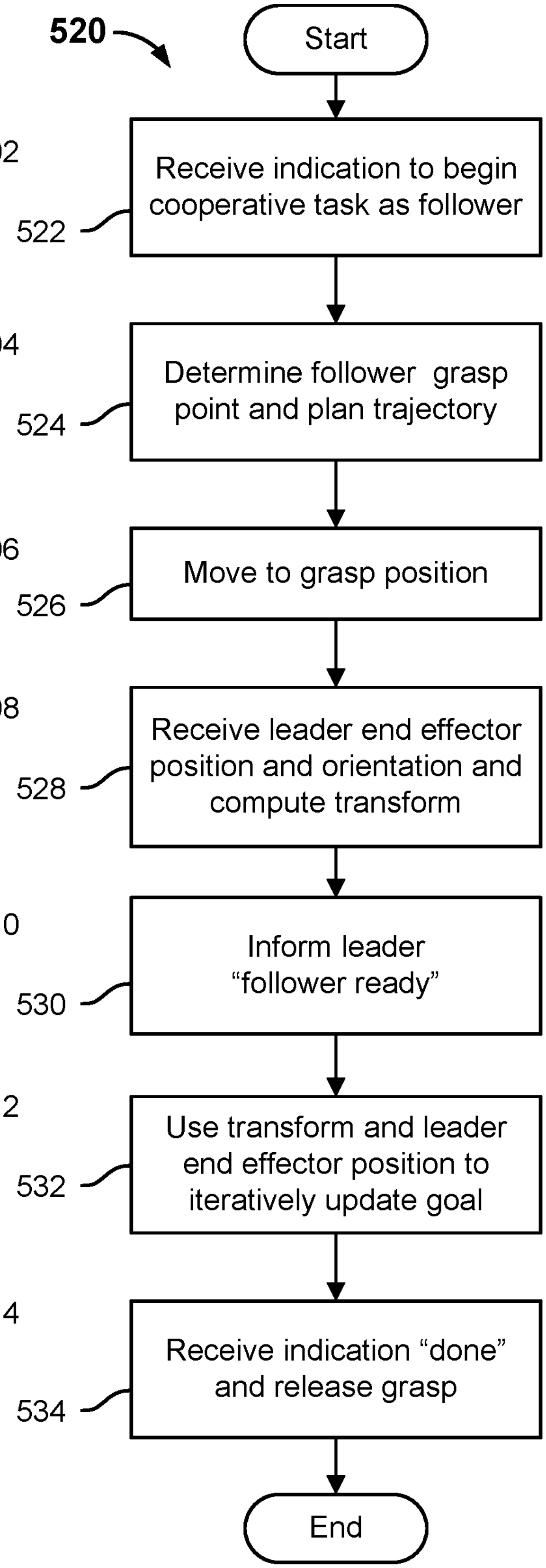
FIG. 5B is a flow diagram illustrating an embodiment of a process to cooperatively perform a task as a "follower" robot in an embodiment of a robotic system as disclosed herein.

FIG. 5B is a flow diagram illustrating an embodiment of a process to cooperatively perform a task as a "follower" robot in an embodiment of a robotic system as disclosed herein. In various embodiments, process 520 of FIG. 5B may be implemented by a robot controller associated with a robot that is participating as the "follower" in cooperative performance of a task by two or more robots as disclosed herein.

In the example shown, at 522 an indication is received to begin performing a task cooperatively with one or more other robots in the "follower" role, as disclosed herein. At 524, the follower determines a grasp point—e.g., one on an opposite side of the object from the side at which the "leader" has indicated it will grasp the object—and plans a trajectory to move into position to grasp the object at that point. At 526, the follower moves its end effector to the determined grasp position and grasps the object, e.g., in response to receiving an indication that the leader has completed its grasp. At 528, the leader's end effector position and orientation information are received, and the follower uses this information along with information about the object (e.g., the size of the object in the dimension that separates the leader's end effector and the follower's end effector) and computes a transform. In various embodiments, the transform comprises a matrix or other mathematical construct that can be applied to the position and orientation of the leader's end effector, typically expressed in the leader's frame of reference, to provide a corresponding position and orientation for the follower's end effector that would maintain the relative position and orientation of the follower's end effector with respect to the leader's end effector as the end effectors and the object grasped between them are moved through the workspace to the destination at which the object is to be placed. At 530, the follower robot informs the leader that the follower is "ready", e.g., the follower has grasped the objected, computed the transform, and is ready to maintain the position of its end effector relative to (e.g., opposite) the leader's end effector.

At 532, as the leader robot begins to move along the trajectory determined independently by the leader, the follower uses the transform it computed and successively received position and orientation information for the leader's end effector, as it is moved through the workspace. For example, for each of at least a subset of the received positions and/or orientations of the leader's end effector, the follower computes a new goal position and/or orientation for its own end effector and applies torques to it motors as determined to be needed to minimize the error (e.g., difference) between the current position and/or orientation of its end effector and the current goal.

At 534, the follower receives an indication (e.g., from the leader) that the cooperative task is "done", in response to which the follower releases its grasp and the process 520 ends.

In various embodiments, techniques disclosed herein are used to cooperatively perform pick and place tasks, e.g., in connection with singulation/sortation, kitting, palletization or depalletization, and/or truck or other container loading or unloading.

Figure 6A:
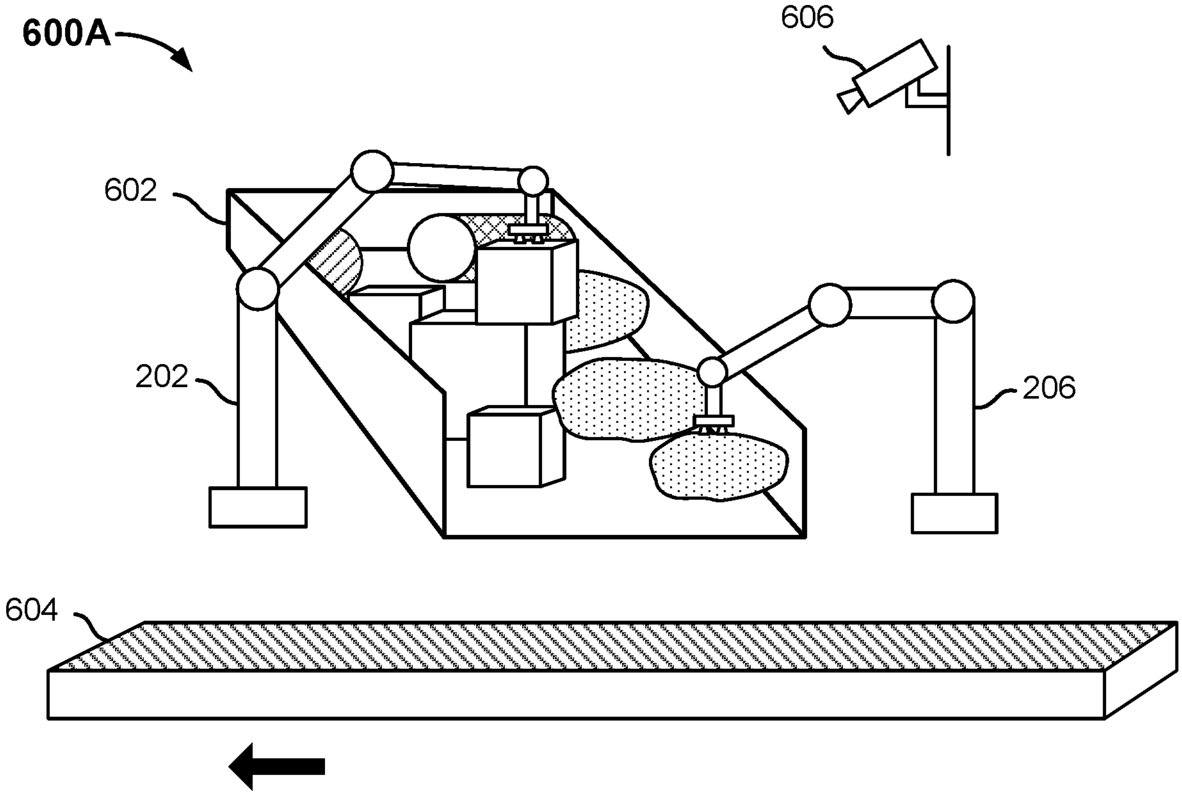
FIG. 6A is a diagram illustrating an embodiment of a robotic system configured to use two or more robots to cooperatively pick and place an object.

FIG. 6A is a diagram illustrating an embodiment of a robotic system configured to use two or more robots to cooperatively pick and place an object. In the example shown, system and environment 600A illustrates use of techniques disclosed herein in the context of a singulation/sortation operation. Items of varying sizes, shapes, and other attributes arrive via a intake conveyance 602, such as a gravity fed chute or ramp and/or an intake conveyor belt or similar structure. In the example shown, robots 202, 206 for FIGS. 2A through 2C are being used in an independent mode of operation to pick items from the intake conveyance 602 and place them singly on a conveyor 604. Image data from camera 606 may be used to generate a three-dimensional view of the workspace, enabling the robots 202, 206 to identify and prioritize target objects, formulate a plan and strategy to grasp an object, and to pick and place the object.

In various embodiments, in the mode of operation shown in FIG. 6A, the robots 202, 206 operate independently but in a cooperative way. For example, the robots 202, 206 may alternate picking from the intake conveyance 602 and placing on the conveyor 604. As one (e.g., 202) is picking from the intake conveyance 602 the other is placing on the conveyor 604, and vice versa.

Figure 6B:
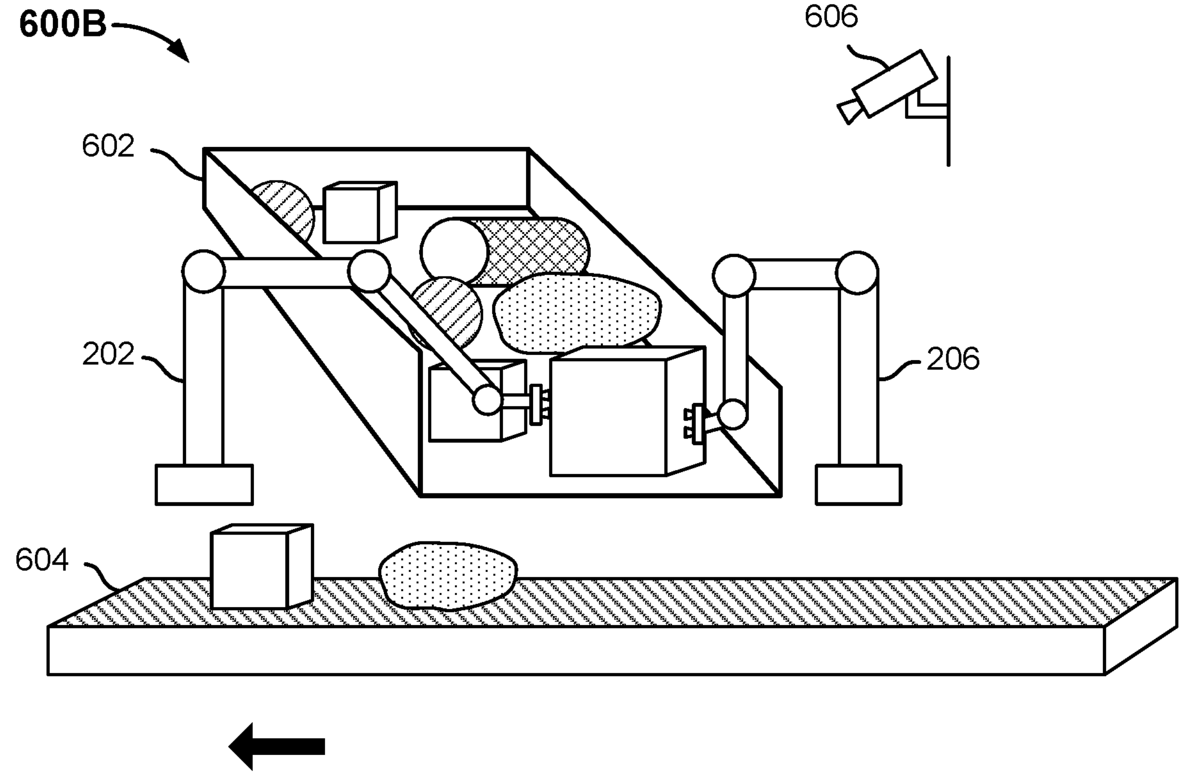
FIG. 6B is a diagram illustrating an embodiment of a robotic system configured to use two or more robots to cooperatively pick and place an object.

FIG. 6B is a diagram illustrating an embodiment of a robotic system configured to use two or more robots to cooperatively pick and place an object. In the example and state as shown in FIG. 6B, robots 202, 206 are being used to cooperatively pick and place a large box that has arrived at the pick area of the intake conveyance 602. Image data from camera 606 may have been used to detect the large box and/or determine (e.g., by lookup) its weight and/or other attributes indicating the need to use the two robots 202, 206 to cooperatively pick and place the box.

In various embodiments, robots 202, 206 cooperate as disclosed herein to pick and place the large box. For example, robot 202 may operate as the "leader" robot, implementing process 500 of FIG. 5A, while robot 206 serves as the "follower" robot, implementing process 520 of FIG. 5B, or vice versa.

Once done placing the large box shown in FIG. 6B onto conveyor 604, the robots 202, 206 may resume operating independently, as described above.

Figure 7:
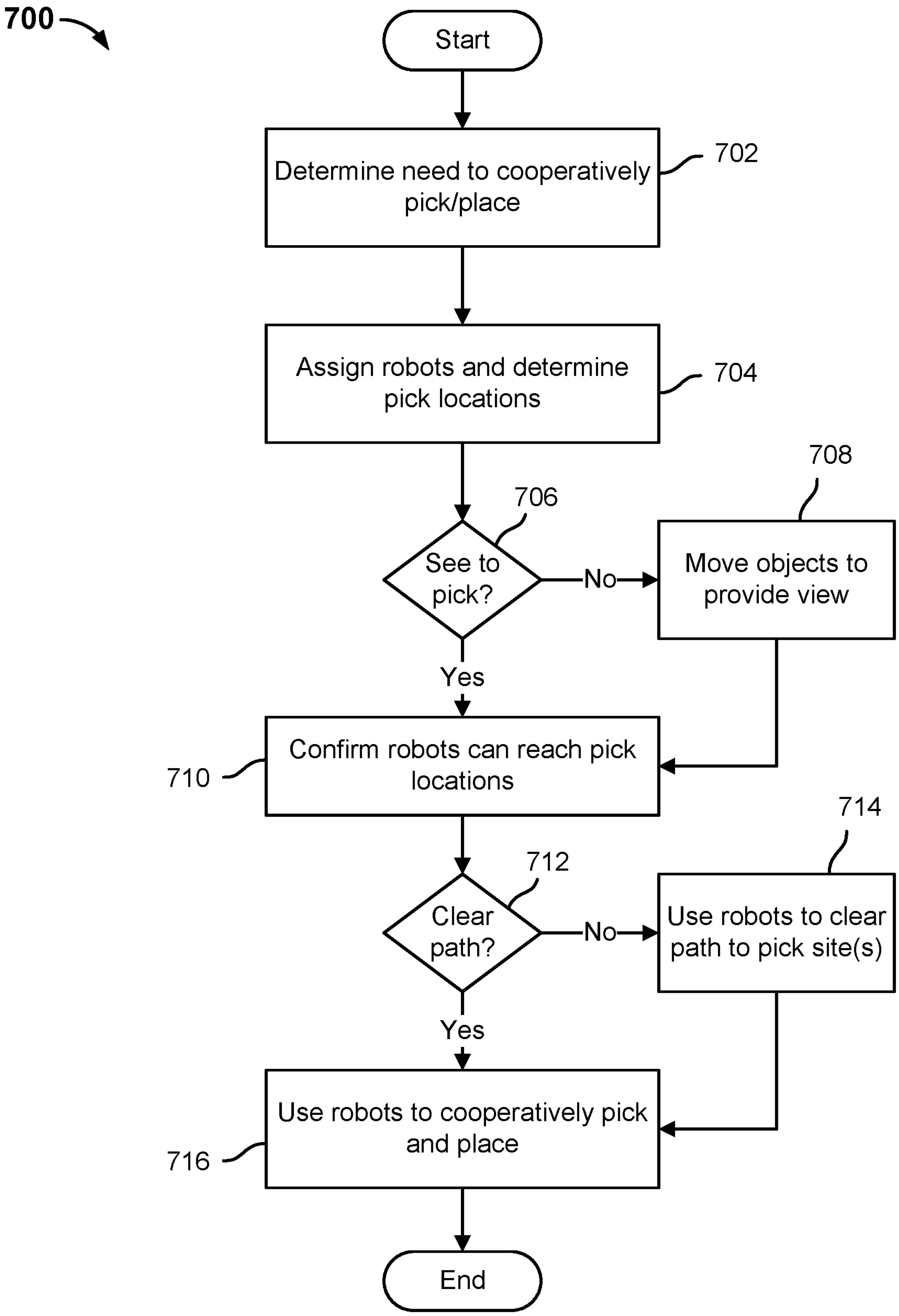
FIG. 7 is a flow diagram illustrating an embodiment of a process to use two or more robots to cooperatively pick and place an object.

FIG. 7 is a flow diagram illustrating an embodiment of a process to use two or more robots to cooperatively pick and place an object. In various embodiments, process 700 of FIG. 7 may be implemented by one or more computers, such as control computer 112 of FIG. 1, and/or by one or more other computers and/or processors comprising a robotic system as disclosed herein. In the example shown, at 702 a need to use two or more robots to cooperatively perform a pick and place task is determined. For example, a computer, such as control computer 112 of FIG. 1, and/or controllers or other control modules associated with individual robots and/or a higher-level controller of a hierarchical controller may make the determination. At 704, two or more robots are assigned (e.g., by themselves, by a coordinator, etc.) to perform the task cooperatively and for each a corresponding pick location (on the object) and position (e.g., for the end effector and/or robotic arm) are determined (or attempted to be determined). If at 706 it is determined that a clear enough view is not available to enable a pick location to be determined for one or more of the robots, then at 708 one or more robots may be used to move other objects out of the way to provide a clearer field of view. If the pick locations can be seen (706) or once objects have been moved (708) to provide a clear view, at 710 a determination is made as to whether all participating robots have a clear path or trajectory each to move to its corresponding pick position without collision. If any robot does not have a clear path (712), at 714 one or more robots are used to move objects as necessary to provide a clear path. For example, the target object may be pushed or pulled out from a cluttered pile of items. Or, objects adjacent to the target object or in the path between an end effector and its pick position may be moved out of the way, either by the robot needing to have its path to its pick position cleared or by another robot.

In some cases, a robot may not be able to see its pick location clearly. In some embodiments, such a robot may use force sensors or other tactile feedback to feel its way into position to grasp the object.

Once every participating robot has a clear path to its pick position (712, 714), the robots work cooperatively to perform the pick and place task, as disclosed herein. For example, one robot may operate as the "leader", implementing process 500 of FIG. 5A, while another serves as the "follower", implementing process 520 of FIG. 5B.

In various embodiments, techniques disclosed herein may be employed to use two or more robots to cooperatively pick and place an object, such as an object that is too heavy, floppy, bulky, etc. for a single robot to pick and place.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A robotic system, comprising:
a first robotic arm having a first end effector;
a second robotic arm having a second end effector; and
a control computer configured to use the first robotic arm and the second robotic arm to pick and place a plurality of objects, including by using the first robotic arm and the second robotic arm to work cooperatively to pick and place one or more of the objects, including by:
determining an attribute of a target object based at least in part on image data received from one or more cameras mounted statically in a workspace in which the first robotic arm and the second robotic arm are located;
using the attribute to look up a dimension or weight of the target object; and
determining based at least in part on the looked up dimension or weight that the target object is too large or too heavy to be manipulated singly by either the first robotic arm or the second robotic arm and concluding based on said determination that both the first robotic arm and the second robotic arm will be required to work cooperatively to pick and place the target object;
wherein the control computer is configured to use a force sensor or other tactile feedback to use the first robotic arm or the second robotic arm to grasp by feel an object at a location that is not visible to the control computer, including by using tactile perception to blindly explore the back side of the object to find a stable and collision-free pick location.

2. The system of claim 1, further comprising a camera positioned to generate the image data associated with a workspace in which the first robotic arm and second robotic arm are located.

3. The system of claim 1, wherein the control computer includes two or more processors distributed at two or more nodes.

4. The system of claim 1, wherein the control computer implements a hierarchical planner that includes an individual robot controller for each of the first robotic arm and the second robotic arm and a higher-level controller configured to coordinate operation of the first robotic arm in cooperation with the second robotic arm to cooperatively pick and place said one or more of the objects.

5. The system of claim 1, wherein to perform a given task to cooperatively pick and place a given item, the first robotic arm is operated in a leader mode and the second robotic arm is operated in a follower mode.

6. The system of claim 5, wherein the first robotic arm is configured, when in the leader mode, to independently plan a trajectory to move a given object to be cooperatively picked and placed, grasp the given object, and move the given object along the planned trajectory.

7. The system of claim 6, wherein the second robotic arm is configured, when in the follower mode, to grasp the given object, compute a transform based at least in part on a position and orientation of the first end effector, and inform the first robotic arm that the second robotic arm is ready to move the given object.

8. The system of claim 1, wherein the first robotic arm and the second robotic arm are configured to independently pick and place objects when not working cooperatively to pick and place said one or more of the objects.

9. The system of claim 1, wherein the control computer is configured to move one or more of the plurality of objects each from a starting position that at least partly obstructs a line of sight between a camera or other sensor and a given object to be picked and placed cooperatively, based at least in part on a determination that a less obstructed view of the given object is needed to perform cooperatively a pick and place task with respect to the given object.

10. The system of claim 1, wherein the control computer is configured to use one or both of the first robotic arm and the second robotic arm to pull or push a given object into a field of view of a camera or other sensor to facilitate a task to use the first robotic arm and the second robotic arm to cooperatively pick and place the given object.

11. The system of claim 1, wherein the control computer is configured to use one or both of the first robotic arm and the second robotic arm to move one or more of the plurality of objects out of the way to enable one or both of the first robotic arm and the second robotic arm to be used to grasp a given object.

12. The system of claim 1, wherein the control computer is configured to use the first robotic arm and the second robotic arm to alternate in picking and placing objects included in the plurality of objects when not using the first robotic arm and the second robotic arm to work cooperatively to pick and place a given object.

13. The system of claim 1, wherein the control computer is configured to ensure the first robotic arm and the second robotic arm do not collide with each other or with obstacles in the workspace when performing pick and place tasks.

14. A method, comprising:
using a first robotic arm and a second robotic arm to pick and place a plurality of objects, including by using the first robotic arm and the second robotic arm to work cooperatively to pick and place one or more of the objects, including by
determining an attribute of a target object based at least in part on image data received from one or more cameras mounted statically in a workspace in which the first robotic arm and the second robotic arm are located;
using the attribute to look up a dimension or weight of the target object; and
determining based at least in part on the looked up dimension or weight that the target object is too large or too heavy to be manipulated singly by either the first robotic arm or the second robotic arm and concluding based on said determination that both the first robotic arm and the second robotic arm will be required to work cooperatively to pick and place the target object; and
using a force sensor or other tactile feedback to use the first robotic arm or the second robotic arm to grasp by feel an object at a location that is not visible to a control computer configured to control one or both of the first robotic arm and the second robotic arm, wherein said grasping by feel includes using tactile perception to blindly explore the back side of the object to find a stable and collision-free pick location.

15. The method of claim 14, wherein using the first robotic arm and the second robotic arm to work cooperatively to pick and place a given object includes using the first robotic arm in a leader mode and the second robotic arm in a follower mode.

16. A computer program product embodied in a non-transitory computer readable medium and comprising computer instructions for:

using a first robotic arm and a second robotic arm to pick and place a plurality of objects, including by using the first robotic arm and the second robotic arm to work cooperatively to pick and place one or more of the objects, including by determining an attribute of a target object based at least in part on image data received from one or more cameras mounted statically in a workspace in which the first robotic arm and the second robotic arm are located;

using the attribute to look up a dimension or weight of the target object; and determining based at least in part on the looked up dimension or weight that the target object is too large or too heavy to be manipulated singly by either the first robotic arm or the second robotic arm and concluding based on said determination that both the first robotic arm and the second robotic arm will be required to work cooperatively to pick and place the target object; and using a force sensor or other tactile feedback to use the first robotic arm or the second robotic arm to grasp by feel an object at a location that is not visible to a control computer configured to control one or both of the first robotic arm and the second robotic arm, wherein said grasping by feel includes using tactile perception to blindly explore the back side of the object to find a stable and collision-free pick location.

17. The system of claim 1, wherein the second robotic arm is configured to receive a request to work cooperatively with the first robotic arm to pick and place the target object; determine that a current or planned task is of higher priority than the task to work cooperatively with the first robotic arm to pick and place the target object; and delay working cooperatively with the first robotic arm to pick and place the target object until after the higher priority task has been completed.

* * * * *